United States Patent [19]
Hase

[11] Patent Number: 6,092,468
[45] Date of Patent: Jul. 25, 2000

[54] TORQUE CONTROLLED MECHANISM FOR MOVING AND STEERING A TRANSIT VEHICLE

[75] Inventor: Klaus-Ruediger H. Hase, Mount Lebanon, Pa.

[73] Assignee: DaimlerChrysler AG, Germany

[21] Appl. No.: 09/046,342

[22] Filed: Mar. 23, 1998

[51] Int. Cl.$^7$ .................................................. B61C 11/00
[52] U.S. Cl. .......................... 105/73; 105/133; 105/136; 104/305; 246/182 R
[58] Field of Search ................. 105/73, 136, 133, 105/135, 137; 246/167 R, 182 R, 201, 202; 104/288, 295, 300, 304, 305; 180/6.28, 6.5

[56] References Cited

U.S. PATENT DOCUMENTS

| | | |
|---|---|---|
| 57,696 | 9/1866 | Fletcher . |
| 3,064,744 | 11/1962 | Jennings ................................ 180/6.5 |
| 3,515,405 | 6/1970 | Segar ..................................... 280/113 |
| 3,563,327 | 2/1971 | Mier ....................................... 180/65 |
| 3,748,564 | 7/1973 | Ohba ..................................... 318/587 |
| 3,993,156 | 11/1976 | Rubel ..................................... 180/98 |
| 4,079,803 | 3/1978 | Takada et al. ......................... 180/98 |
| 4,541,051 | 9/1985 | Jarret et al. ........................... 364/424 |
| 4,579,181 | 4/1986 | Jarret et al. ........................... 180/6.5 |
| 4,911,081 | 3/1990 | Meret ..................................... 105/168 |
| 5,136,218 | 8/1992 | Pessina ................................... 318/139 |
| 5,181,473 | 1/1993 | Petit et al. ............................. 105/133 |
| 5,234,184 | 8/1993 | Chew ..................................... 246/194 |
| 5,456,332 | 10/1995 | Borenstein ............................ 180/167 |
| 5,511,749 | 4/1996 | Horst et al. ........................... 246/187 |
| 5,921,338 | 7/1999 | Edmonson ............................. 180/6.5 |

*Primary Examiner*—S. Joseph Morano
*Assistant Examiner*—Robert J. McCarry, Jr.
*Attorney, Agent, or Firm*—Webb Ziesenheim Lodgson Orkin & Hanson, P.C.

[57] ABSTRACT

A bi-directional operating automated guided transit system such as a people mover including a vehicle having at least one pair of opposing axles, each axle having a wheel with its own drive system. The vehicle is capable of providing torque controlled steering to the vehicle. Sensors mounted on the vehicle detect the path of a guide track and, through a controlling system, direct the motors to provide a constant torque to both wheels, thereby directing the vehicle along a straight path or, in the alternative, direct the motors associated with each wheel to provide differing torques, thereby causing the vehicle to turn. The system also permits a vehicle operator to bypass the sensor signal and to manually steer the vehicle.

19 Claims, 3 Drawing Sheets

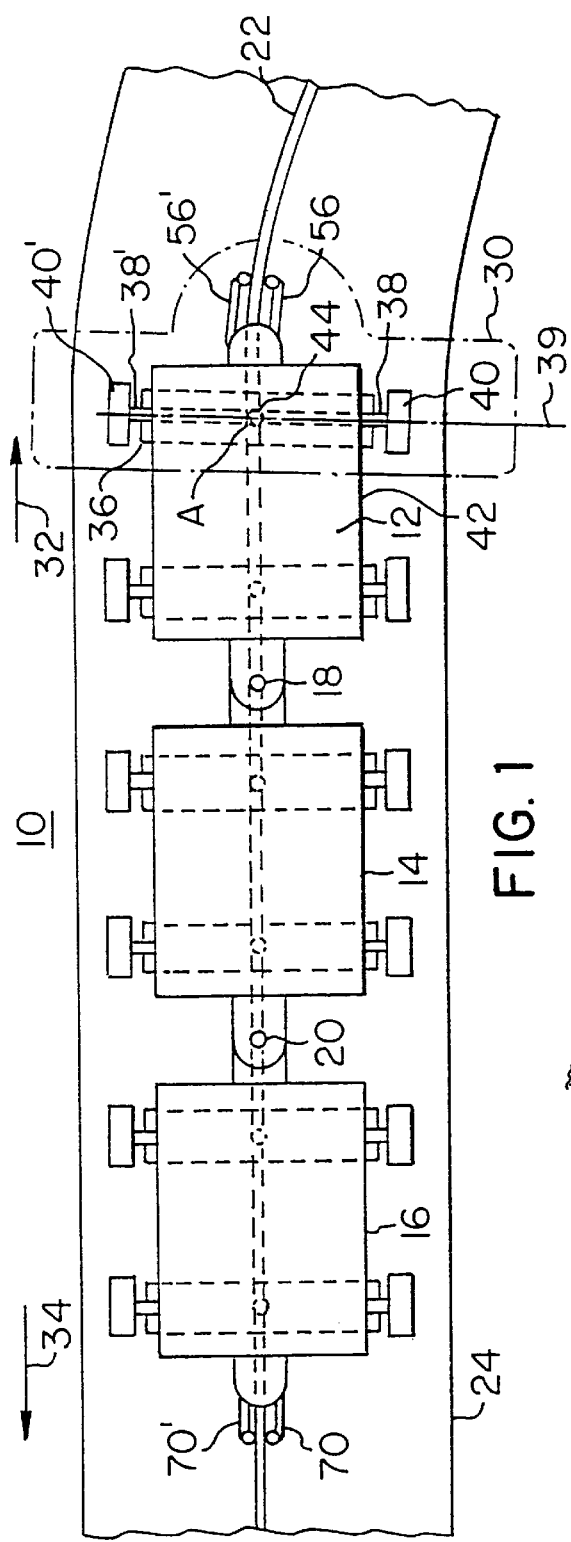
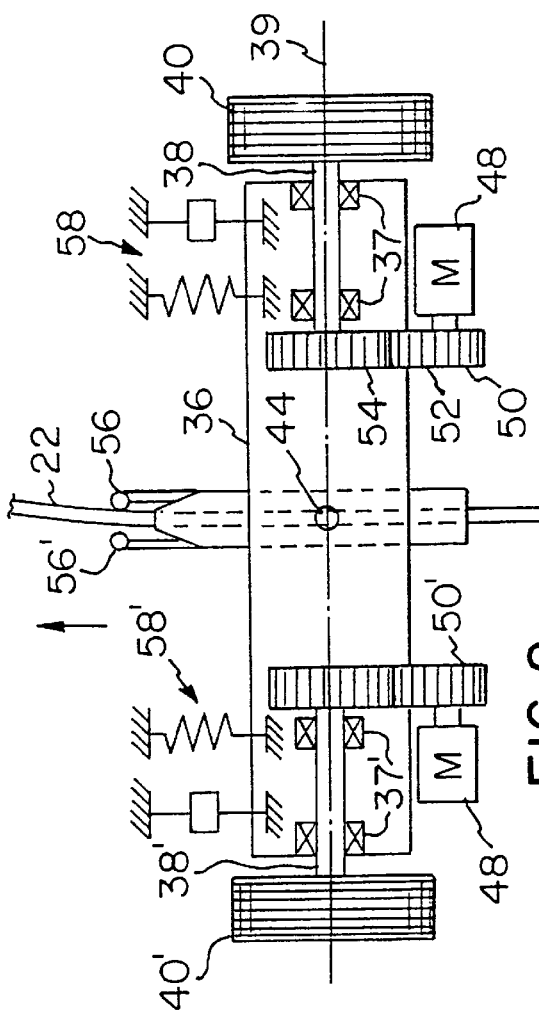

TORQUE CONTROLLED MECHANISM FOR MOVING AND STEERING A TRANSIT VEHICLE

BACKGROUND OF THE INVENTION

1. Field of the Invention

The invention relates generally to transportation vehicles and particularly to a method and apparatus for moving and steering a transit vehicle by controlling the torque transmitted to individual wheels on the vehicle.

2. Description of the Prior Art

There are generally two types of transit vehicles. One type, known as a light rail vehicle, has wheels which rest upon and are guided by a steel rail track which defines the course the vehicle will maintain. The vehicle typically is not suitable for travel on a surface other than the steel track. The second type of transit vehicle, known as a people-mover (bi-directional operating automated guided transit system), uses rubber or steel wheels which rest on the ground to the exclusion of any predirected steel rail tracks. However, this type of vehicle employs a guidance system by which a mechanical linkage in the vehicle steering mechanism physically engages either a guide rail protruding from the roadbed, as described in U.S. Pat. No. 3,515,405 entitled "Axle Suspension System for Transit Vehicles" by N. R. Segar, or the side walls of a trough in which the vehicle rides to steer the vehicle. The propulsion system for such a vehicle is typically a single motor which transmits torque to a differential which then distributes the torque to the driving wheels of the vehicle. Therefore, such a vehicle requires one mechanism for steering and a second mechanism for propelling the vehicle.

Additionally, the steering mechanism for such a vehicle includes a purely mechanical linkage which turns the wheels based upon a force exerted by a mechanical follower in the linkage against guides along a track. This arrangement produces significant lateral forces against the guides. This arrangement requires not only a mechanical linkage that will withstand the forces transmitted from the mechanical follower to steer the wheels but also requires a guide rail with sufficient strength to withstand the lateral forces produced by the mechanical linkage while turning the wheels. Additionally, such a relatively complex mechanical linkage adds weight to the vehicle and therefore requires additional energy to propel the vehicle. Also, the mechanical linkage has physical limitations which restrict the turning radius of the vehicle.

U.S. Pat. No. 3,563,327 teaches a vehicle having a pair of colinear rear axles independently driven to propel and to steer the vehicle. However, the axles are mounted directly to the vehicle frame such that the entire vehicle pivots in the exact fashion of the rear axles. Such an arrangement may be suitable for a vehicle intended to travel in a single direction and permitted to turn about a large radius, since the vehicle will pivot with the axles. However, this arrangement does not permit the vehicle to be bi-directional or to turn about a smaller radius.

It is an object of the present invention to eliminate a significant part of the mechanical linkage used for steering and additionally eliminate the differential as part of a drive train, thereby providing a relatively simple and lightweight mechanical arrangement for propelling and steering a vehicle.

It is a further object of this invention to provide a vehicle with independently driven wheels on a pivoting platform that may be used to turn the vehicle about a small radius and also to propel the vehicle in a forward or rearward direction.

SUMMARY OF THE INVENTION

The present invention is an apparatus for propelling and steering a transit vehicle that includes a forward pair and a rearward pair of opposing colinear axles pivotally mounted to the vehicle frame, one wheel attached to each of the axles, and a driver associated with each wheel for applying torque to and independently rotating the wheels on each axle, thereby forming independently driven axle pairs.

The present invention is also a method for propelling and steering a transit vehicle having at least one vehicle segment, a forward pair and a rearward pair of opposing colinear axles pivotally mounted to the vehicle frame of each segment, a wheel attached to each of the axles and a driver associated with each wheel. The method includes the steps of advancing the vehicle along a course marked by mechanical or electronic guide signals, detecting with sensors on the vehicle whether or not the vehicle is properly tracking the guide signals; and imparting through the drivers the necessary torque to rotate each wheel at the same speed to maintain the vehicle along a straight path or to rotate each wheel at different speeds to turn the vehicle.

BRIEF DESCRIPTION OF THE DRAWINGS

FIG. 1 is a plan view of a transit vehicle made up of three articulated segments including a combined drive and steering mechanism in accordance with the present invention;

FIG. 2 is a plan view of one embodiment of the drive and steering mechanism of the transit vehicle illustrated in FIG. 1;

DESCRIPTION OF THE PREFERRED EMBODIMENTS

Figure 3:
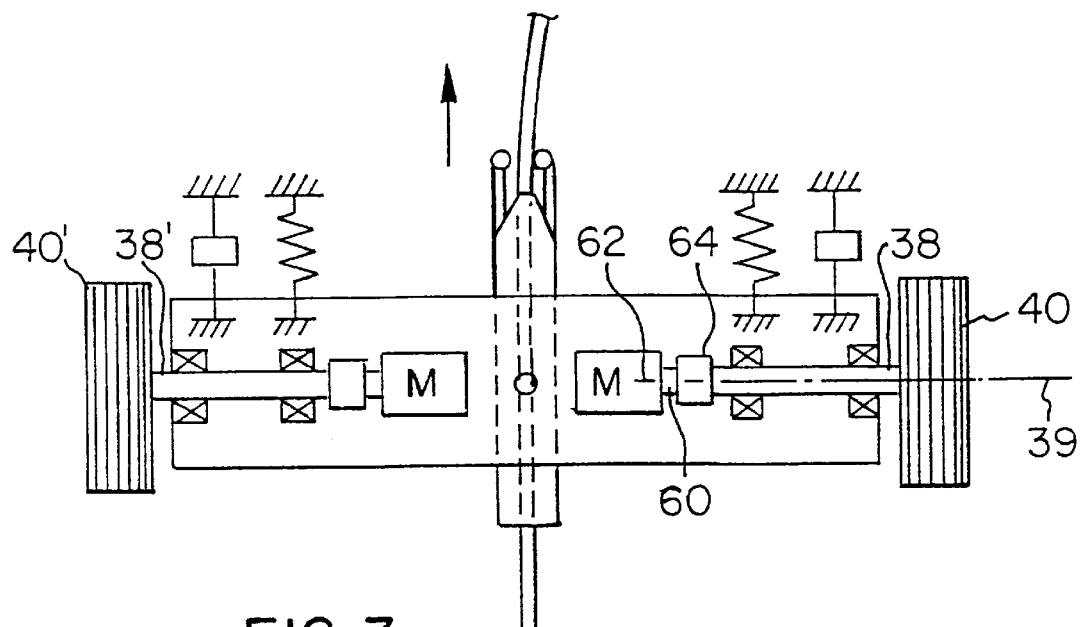
FIG. 3 is a plan view of a second embodiment of the drive and steering mechanism for the transit vehicle illustrated in FIG. 1.

FIG. 1 illustrates a transit vehicle 10 having a forward articulated segment 12, a middle articulated segment 14 and a rear articulated segment 16 connected by pivoting couplings 18 and 20. The transit vehicle 10 is moved along a guide track 22 which follows the contour of a dedicated guideway 24. Each articulated segment 12, 14, 16 has associated with it two pairs of wheels used to propel and to steer the respective articulated segment. For articulated segment 12, a typical propulsion and steering mechanism is circled and identified as Item 30 in FIG. 1. The vehicle 10 may move in a forward direction as indicated by arrow 32, or in a backward direction as shown by arrow 34.

Each segment of the transit vehicle 10 generally includes a forward and rearward axle platform. One typical axle platform 36 supports an arrangement of parts mounted symmetrically about the axle platform 36. Therefore, the hardware associated with the right side of the axle platform 36 will be discussed with the understanding that the hardware on the left side of the axle platform 36 is identical. However, for identification purposes, the left hand hardware will be identified when necessary by highlighting the reference numeral with a prime (').

The axle 38 is secured to the axle platform 36 in a conventional fashion and supported by bearings 37 which guide but permit rotation of the axle 38. At least one wheel 40 is attached to the axle and contacts the dedicated guideway 24. The axle 38' on the axle platform 36 is colinear with axle 38 along axis 39. Additionally, the axle platform 36 is pivotally mounted to the vehicle body 42 by a pivot 44 at a midpoint on the axle platform 36.

FIG. 1 also illustrates pivoting axle platforms on each of the segments 12, 14, 16. This feature permits each segment to turn on a smaller radius than would be possible if each axle platform, or even one axle on each segment, was fixed and unable to pivot on each segment.

Referring to FIG. 2, a driver 48 which may be comprised of an electric motor M is structurally attached to the axle platform 36 and transmits torque to a drive train 50 which may be made up of a driver gear 52 associated with the driver 48 which engages a driven gear 54 associated with axle 38 to transmit torque to the wheel 40.

The axle platform 36 may be moved along a straight line if the rotational speed of wheel 40 and wheel 40' is identical. This will be referred to as the neutral position. However, it is also possible to rotate the axle platform 36 about pivot 44 in, for example, a clockwise direction by rotating wheel 40' faster than wheel 40. In the opposite manner, the axle platform 36 may be rotated in the counterclockwise direction about pivot 44. Both axle 38 and axle 38' are colinear along an axis 39 and therefore rotate as a unit.

Right sensor 56 extends from the axle platform 36 at a location away from pivot 44 and is used in conjunction with symmetrically placed left sensor 56' to provide a signal that will be processed and used to activate drivers 48 and 48' to move the axle platform 36 in a straight direction or to move the axle platform clockwise or counterclockwise as may be required to follow the guide track 22.

The sensor/guide track relationship may be any one of a variety that permits the sensor to detect any deviation of the axle platform 36 in following the path of the guide track 22. Specifically, the sensor may be one or more receiving antennae mounted on the axle platform 36 to receive signals transmitted by one or more way-side transmitter antenna cables defining the guide track 22. Under these circumstances the cables may be on or underneath the surface of the dedicated guideway 24. In the alternative, the sensors 56 may be force transducers which physically contact a guide track 22 protruding from the roadway and provide signals indicating increased or decreased force on the sensors as a result of following or deviating from the path of the guide track 22. Under these circumstances, the guide track 22 need only be large enough to contact the sensors and impart to them a small force for guidance.

In order to bias the axle platform 36 to a neutral position in which the wheels are oriented to travel in a straight path, a spring/damper device 58 is connected between a portion of the axle platform 36 away from the pivot 44 and is also connected to the transit vehicle body (not shown).

Unlike FIG. 2 which illustrates a drive train 50 made up of a driver gear 52 and a driven gear 54, FIG. 3 shows an arrangement in which there is no mechanical drive train and the motor M has a shaft 60 with an axis 62 which is colinear with the axis 39 of axle 38. The shaft 60 is connected to the axle 38 by a coupling 64, which may be a splined sleeve which meets with splined ends of the shaft 60 and axle 38. Other coupling known to those skilled in the art may also be utilized.

Figure 4:
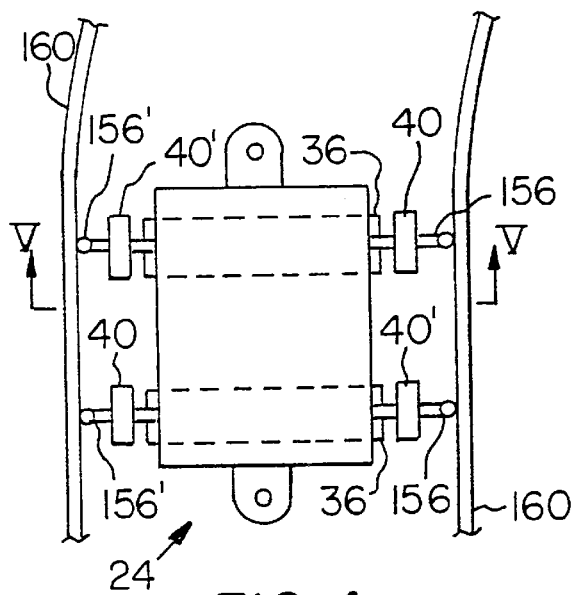
FIG. 4 is a plan view of a third embodiment in which the sensors respond to the wall of the guideway.
Figure 5:
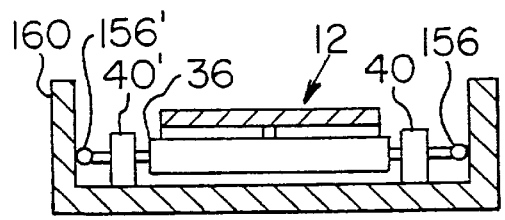
FIG. 5 is a section of view 5—5 found in FIG. 4.

FIG. 1 illustrates sensors 56, 56', and additional sensors 70, 70' following a guide track 22. It is possible to locate these sensors in positions other than those in this figure. Specifically, as illustrated in FIG. 4 and FIG. 5, sensors 156 and 156' extend from the axle platform 36 in a transverse direction relative to the movement of the segment 12 and contact the sides of the wall 160 which extends from the guideway 24 to define the track. In this instance, the sensors 156 and 156' would be contact sensors, such as transducers, or proximity sensors to detect the wall 160 of the guideway 24.

Figure 6:
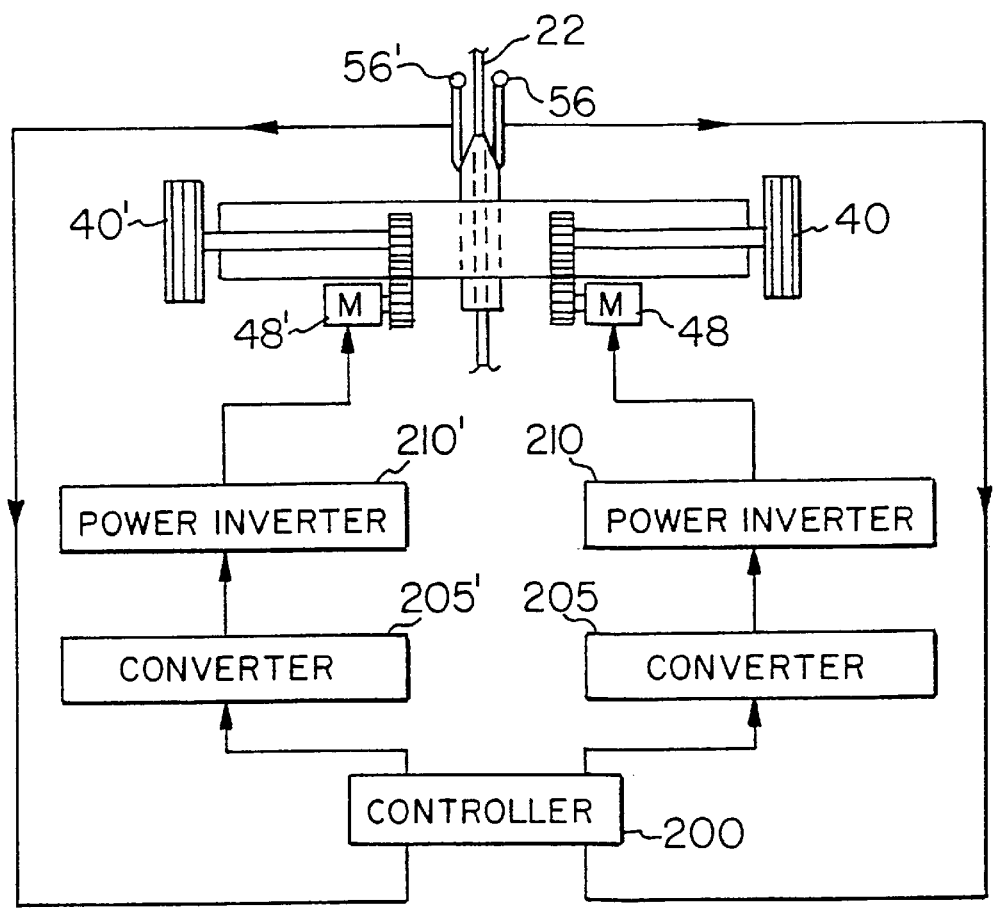
FIG. 6 is a schematic illustrating the interaction between the sensors and the drivers of the subject invention.

FIG. 6 illustrates a schematic showing the process by which signals received by the sensors 46, 46' are translated to operative commands to each driver 48 and 48'. The signals from sensors 56, 56' are determined by the curvature of the guide track 22 and the signals will change based upon deviations of the sensors 56, 56' from that curvature. An axle coordination controller 200 receives and processes these input signals to generate an output signal which is converted from a digital value to an analog value by converters 205, 205'. These analog values are used by the power inverters 210, 210' to produce an output current used to generate torque in drivers 48, 48'. Based upon the degree to which the sensors 56, 56' follow the guide track 22, the output current provided to the drivers 48, 48' will vary. Methods for processing signals such as those provided by sensors 56, 56' to produce an output current for controlling a motor are known to those skilled in the art. It should be noted it is possible to use only a single sensor to detect the curvature of the guide track 22 but for illustrative purposes, and since some embodiments of this invention utilize them, two sensors are shown in FIG. 3.

Typically, these transit vehicles are capable of travel along a guideway designed for their exclusive use. Power is provided to the vehicles by lines which follow the guideway. In order to perform maintenance or repairs upon the vehicle, it is necessary to transport the vehicle to a remote facility. This becomes very expensive and time consuming when the vehicle must be towed or transported on a flatbed truck.

While what has been discussed are sensors 56 and 56' which produce a signal based upon proximity to the guide track 22, it is entirely possible for a human operator to manually generate an override to control drivers 48 and 48' that is similar to that produced by sensors 56 and 56'. Under such circumstances the operator could simulate signals from sensors 56 and 56' so that the operator would be able to steer the transit vehicle independently of the guide track 22. Additionally, the vehicle may be powered for a short time by an on-board independent power supply such as a battery pack. Under the circumstances, the vehicle may be driven by the operator to such a remote facility, thereby eliminating the need for towing or transporting the vehicle on a flat bed truck.

Returning to FIG. 1, note there is a set of two sensors 56 and 56' located at the forwardmost part of the transit vehicle 10 for sensing the guide track 22 when the transit vehicle 10 is traveling in the forward direction 32. In a preferred embodiment, each articulated segment 12, 14 and 16 of the transit vehicle 10 would have a pair of front wheels and a pair of rear wheels and each of these wheels would have an independent drive train and an independent driver. Under these circumstances the signal from the forwardmost sensors 56 and 56' would be used to orient the wheels 40 and 40' in the forwardmost pair of axles at point A on the guide track and to orient the wheels on the rearward axles. The transit vehicle 10 would proceed in the forward direction 32 until the next pair of axles reach point A. At that time the wheels associated with this set of axles would be turned in a fashion identical to the previous set of wheels and these adjustments would occur as each pair of wheels arrived at point A. The signal to activate the motors in each axle pair for this adjustment could either be time shifted or distance shifted relative to the first pair of wheels such that, as each pair of wheels goes past point A, their orientation is identical. In the alternative, two or more of the articulated segments 12, 14, 16 of the transit vehicle 10 could have independent sets of sensors that would independently provide signals based on their proximity to the guide track 22.

Just as the transit vehicle 10 may move in the forward direction using a set of sensors 56 and 56', it is entirely possible for the transit vehicle 10 to move backward in direction 34. However, this would require using at least one set of sensors at the rearwardmost portion of the transit vehicle. For illustrative purposes, such sensors are shown as 70 and 70' in FIG. 1. The signal received from these sensors would be processed in the same fashion as that for sensors 56 and 56'. Alternatively, sensors 70 and 70' could be provided on each segment 12, 14, 16, thereby permitting interchangeability of the segment sequence or independent operation of a single segment. Although not specifically illustrated, this can easily be envisioned by combining the sensors 56 and 56' or segment 12 in FIG. 1 and the sensors 70 and 70' on segment 16, onto a single segment. Additionally, the sensors 156 and 156' on segment 12 in FIG. 4 could be duplicated on or near the set of wheels opposite wheels 40 and 40' in FIG. 1.

Figure 7:
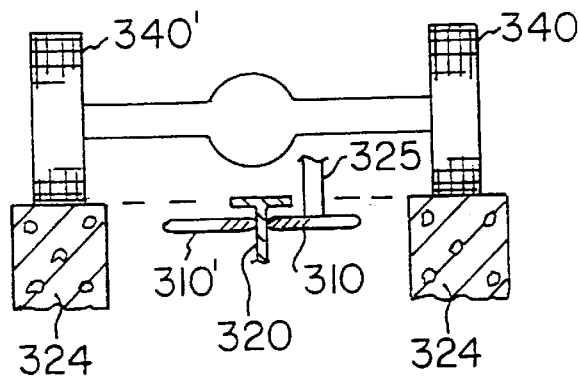
FIG. 7 is a section view of a prior art arrangement in which the central guide rail is recessed.

FIG. 7 illustrates a prior art embodiment similar to that presented in U.S. Pat. No. 3,515,405 in which the transit vehicle is guided entirely by a mechanical device utilizing guide wheels 310 which follow a central guide rail 320 and transmit forces via a guide post 325 to a steering linkage to control the wheels 340. The central guide rail 320 is firmly anchored beneath the surface of the roadway 324 to withstand the high forces from the guide wheels to steer the vehicle. Furthermore, the rail 320 must be structurally sufficient to support these forces. In this embodiment, the guide rail 320 is recessed below the top of the roadway 324 so the guide wheels 310 and guide post 325 must extend beneath the top of the roadway 324 to engage the guide rail 320. While this arrangement is sufficient when the roadway has a channel to accept this protruding mechanism, whenever the vehicle must be transported for maintenance or repair, it must be carried to, among other things, avoid damaging this mechanism.

Figure 8:
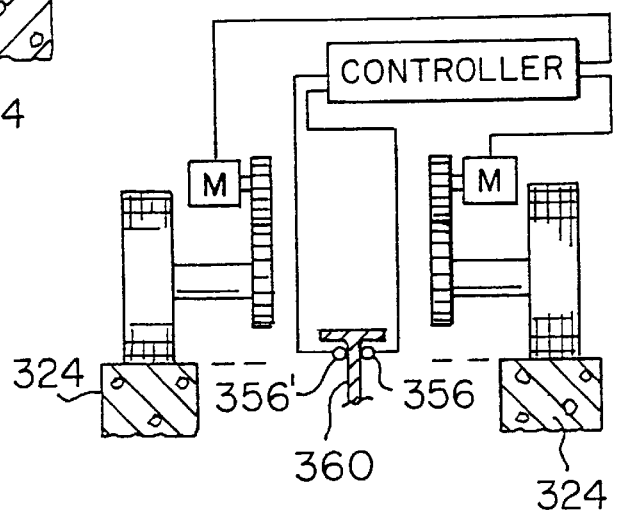
FIG. 8 is a section view of a fourth embodiment of the invention in which the sensors contact a central guide rail protruding above the roadway.

FIG. 8 illustrates still another embodiment of the subject invention which eliminates the protruding mechanism just described. Specifically, the sensors 356 contact the central guide rail 360 for steering. The central guide rail 360 may protrude from the surface of the roadway 324 and may be smaller than the central guide rail 320 illustrated in FIG. 7 because the forces required to influence the sensors 356 may be much smaller. By elevating the guide rail 360 above the roadway 324, the sensors 356 may be elevated above the roadway 324, thereby permitting the transit vehicle to travel on surfaces other than the roadway 324 when necessary for maintenance or repair operations without the need to elevate the vehicle so the steering mechanism clears the road surface.

The use of propelling and steering the transit vehicle using individual motors at each wheel with remote sensors provides a number of advantages. First of all, tire wear associated with conventional guidance systems using mechanical linkages is reduced since now the speed of a wheel may be adjusted to minimize sliding. Second of all, oscillation between adjacent axles caused at high speeds may be eliminated by independently driven axles. Third of all, the remote sensors are activated by forces much less than those required in a purely mechanical system and, as a result, the guide rail and even the associated switches may be smaller and lighter. Fourth of all, the independently driven wheels permit the transit vehicle to turn about a smaller radius than that radius possible using a mechanical linkage. Finally, the elimination of the linkage necessary to steer the vehicle by purely mechanical forces significantly reduces the weight of the transit vehicle and the energy required to propel the vehicle.

It is entirely possible to add axles on one or more vehicle segments which are not associated with a driver to act as idler wheels. These may provide structural support for elongated vehicle segments.

As should now be evident, the present invention, which can be implemented on existing guideways, eliminates a significant part of the mechanical linkage employed in prior art to drive and steer transit vehicles and by doing so provides a number of advantages.

Although this invention has been described with reference to a specific embodiment thereof, numerous modifications are possible without departing from the invention and it is desirable to cover all modifications falling within the spirit and scope of this invention.

We claim:

1. An apparatus for propelling and steering a transit vehicle on a guideway having at least one vehicle segment comprised of:
    a) a forward pair and a rearward pair of opposing colinear axles, wherein each axle pair is attached to aseparate axle platform, and wherein each axle platform is pivotally mounted to the vehicle frame of each segment about an axis perpendicular to the colinear axles;
    b) a wheel attached to each of the axles; and
    c) a driver associated with each of the wheels for applying torque to and independently rotating the wheels on the respective axles, thereby forming independently driven axle pairs.

2. The apparatus of claim 1 wherein the drivers are bi-directional to propel the wheels for rotation in either direction.

3. The apparatus of claim 2 further including a sensor for activating any of the drivers in response to external signals.

4. The apparatus of claim 3 wherein the sensor is responsive to an electric field aligned with a dedicated guideway.

5. The apparatus of claim 3 further including a manual override to operate the drivers independent of the sensor.

6. The apparatus of claim 3 wherein the sensor is responsive to a mechanical force imparted by contact of the sensor against a guide rail along a dedicated guideway.

7. The apparatus of claim 3 wherein each pair of axles is supported by an axle platform and wherein a single set of sensors is attached to the axle platform associated with each forward pair of axles on one or more vehicle segments and sends a signal to the rearward pair of axles of the one or more segments when the vehicle is traveling in a forward direction.

8. The apparatus of claim 7 further including additional sets of sensors attached to the axle platform associated with each rearward pair of axles on one or more vehicle segments which send signals to the forward pair of axles of the one or more segments when the vehicle is traveling in a backward direction.

9. The apparatus of claim 2 wherein each pair of axles is supported by an axle platform and wherein there is one set of sensors attached to the axle platform associated with each pair of axles.

10. The apparatus of claim 2 wherein, for each axle pair, a spring/damper mechanism is attached to the vehicle frame and the axle pair to resiliently urge the axle pair into a neutral turning position.

11. The apparatus of claim 2 wherein the vehicle has an on-board independent power source.

12. The apparatus of claim 11 wherein the sensors are mounted upon the vehicle frame and spaced above the guideway wherein the guideway includes one of a vehicle track and a trough, thereby enabling the transit vehicle to travel on surfaces other than the guideway.

13. The apparatus of claim 12 further including manual controls to independently control each driver permitting the vehicle to operate outside of the guideway.

14. The apparatus of claim 1 wherein each driver is a motor with a driver gear attached which engages a driven gear upon the respective axle to turn the respective wheel.

15. The apparatus of claim 1 wherein each driver is a motor with a shaft colinear with and attached to the respective axle to turn the respective wheel.

16. The apparatus of claim 1 further including at least one pair of opposing axles on one or more vehicle segments having undriven wheels.

17. A transit vehicle having a plurality of vehicle segments, each having a vehicle frame, coupled in an articulated fashion wherein each segment has a propelling and steering mechanism comprised of:

a) a forward pair and a rearward pair of opposing colinear axles, wherein each axle pair is attached to a separate axle platform, and wherein each axle platform is pivotally mounted to the vehicle frame of each segment about an axis perpendicular to the colinear axles;
b) a wheel attached to each of the axles; and
c) a driver associated with each of the wheels for applying torque to and independently rotating the wheels on these axles, thereby forming independently driven axle pairs.

18. An apparatus for propelling and steering a transit vehicle on a guideway having at least one vehicle segment comprised of:

a) a forward pair and a rearward pair of opposing colinear axles pivotally mounted to the vehicle frame of each segment;
b) a wheel attached to each of the axles;
c) a driver associated with each of the wheels for applying torque to and independently rotating the wheels on the respective axles, thereby forming independently driven axle pairs wherein each driver is bi-directional to propel the wheels for rotation in either direction; and
d) at least one sensor for activating the drivers in response to external signals, wherein one sensor is associated with each forward pair of axles on one or more vehicle segments and sends a signal to the rearward pair of axles of the one or more segments when the vehicle is traveling in a forward direction.

19. The apparatus of claim 18 further including additional sets of sensors associated with each rearward pair of axles on one or more vehicle segments which send signals to the forward pair of axles of the one or more segments when the vehicle is traveling in a backward direction.

* * * * *